(12) United States Patent
Fechner et al.

(10) Patent No.: US 7,938,900 B2
(45) Date of Patent: May 10, 2011

(54) WATER-BASED PIGMENT PREPARATION

(75) Inventors: Bjoern Fechner, Eppstein (DE); Uwe Bechtold, Bad Vilbel (DE); Andrea Boehmer, Hattersheim (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/298,352

(22) PCT Filed: Feb. 28, 2007

(86) PCT No.: PCT/EP2007/001711
§ 371 (c)(1),
(2), (4) Date: Oct. 24, 2008

(87) PCT Pub. No.: WO2007/124803
PCT Pub. Date: Nov. 8, 2007

(65) Prior Publication Data
US 2009/0095202 A1    Apr. 16, 2009

(30) Foreign Application Priority Data

Apr. 27, 2006  (DE) .................. 10 2006 019 553

(51) Int. Cl.
*C09D 11/02*  (2006.01)
(52) U.S. Cl. .................................. 106/31.86
(58) Field of Classification Search ............... 106/31.86
See application file for complete search history.

(56) References Cited

U.S. PATENT DOCUMENTS

| | | | |
|---|---|---|---|
| 4,156,616 A | 5/1979 | Dietz et al. | |
| 5,180,425 A * | 1/1993 | Matrick et al. | 106/31.58 |
| 5,855,662 A | 1/1999 | Brand et al. | |
| 6,143,807 A | 11/2000 | Lin et al. | |
| 6,332,943 B1 | 12/2001 | Herrmann et al. | |
| 6,436,182 B1 | 8/2002 | Unverdorben et al. | |
| 6,478,866 B1 | 11/2002 | Nyssen et al. | |
| 7,135,067 B2 | 11/2006 | Harz et al. | |
| 7,285,592 B2 | 10/2007 | Hanz et al. | |
| 7,442,245 B2 * | 10/2008 | Blease et al. | 106/31.58 |
| 2002/0002931 A1 * | 1/2002 | Nakano et al. | 106/31.58 |
| 2005/0075415 A1 | 4/2005 | Hare et al. | |
| 2005/0126442 A1 | 6/2005 | Acs et al. | |
| 2005/0182154 A1 | 8/2005 | Berge et al. | |
| 2006/0014856 A1 | 1/2006 | McGorrin et al. | |
| 2006/0247347 A1 | 11/2006 | Glos et al. | |
| 2007/0131144 A1 | 6/2007 | Winter et al. | |

FOREIGN PATENT DOCUMENTS

| | | |
|---|---|---|
| DE | 2638946 | 3/1978 |
| EP | 0585571 | 3/1994 |
| EP | 0735109 | 10/1996 |
| EP | 0801120 | 10/1997 |
| EP | 1049745 | 11/2000 |
| EP | 1650272 | 4/2006 |
| JP | 2002121446 A * | 4/2002 |
| WO | WO 03/006556 | 1/2003 |

OTHER PUBLICATIONS

Machine English Translation of JP 2002-121446.*
PCT International Search Report for PCT/EP2007/001711, mailed Apr. 5, 2007.
PCT English Translation of the International Preliminary Report on Patentability for PCT/EP2007/001711, mailed Dec. 24, 2008.

* cited by examiner

*Primary Examiner* — Jerry Lorengo
*Assistant Examiner* — Veronica Faison Gee
(74) *Attorney, Agent, or Firm* — Anthony A. Bisulca

(57) ABSTRACT

The invention relates to an aqueous pigment preparation comprising (A) at least one organic and/or inorganic pigment, (B) dispersants and/or surfactants, (C) a trihydric or higher polyhydric alkoxylated alcohol, (D) a polyglycol alkyl ether, (E) if desired, hydrotropic oligomers and/or polymers, (F) if desired, fats, oils or fatty acids, (G) if desired, further additives typical in the preparation of aqueous pigment dispersions, and (H) water.

12 Claims, No Drawings

WATER-BASED PIGMENT PREPARATION

The present invention is described in the German priority application No. 102006019553.1, filed Apr. 27, 2006, which is hereby incorporated by reference as fully disclosed herein.

The present invention relates to waterborne pigment preparations and pigment dispersions, to processes for producing them, and to their use for coloring natural and synthetic materials, especially aqueous coating materials, emulsion paints and colored coatings of all kinds.

Known and available on the markets are a multiplicity of pigment preparations for coloring aqueous coating materials, emulsion paints, and other colored coatings. Examples thereof are contained in EP-A-0 735 109, WO 03/006 556 or EP-A-1 049 745 (U.S. Pat. No. 6,478,866 B1). Commonly, anionic, cationic, amphoteric or nonionic dispersants with surfactant character are employed, in macromolecular form where appropriate, to provide physical stabilization of the pigment particles in finely divided form in an aqueous medium. Furthermore, besides the surfactants or dispersants, conventional pigment preparations generally also comprise various additives such as wetting agents, thickeners, preservatives, viscosity stabilizers, fillers, and retention agents. The retention agents, often also called dryout preventatives, ensure that the product does not dry out or start to dry even prior to use. For this purpose use is made frequently of low molecular mass hygroscopic compounds such as glycols, but bring with them the disadvantage of evaporating from the application medium. They are therefore considered VOCs (volatile organic compounds) and are increasingly being regulated by the legislator. VOC-free pigment preparations contain, according to WO 03/006 556 and EP-A-0 585 571, high molecular mass, nonvolatile oligomers or polymers such as polyether polyols (polyglycols), for example.

Hygroscopic nonvolatile oligomers and polymers, however, remain on a long-term basis in the application medium. The remanence of these substances is accompanied by a number of disadvantages. If, for example, an aqueous emulsion paint is colored with a pigment preparation that contains hygroscopic nonvolatile compounds of this kind, the coating of paint acquires a slightly hygroscopic, tacky character. Increased water absorption is the consequence.

It was an object of the present invention, therefore, to provide aqueous pigment preparations which are not only resistant to dryout but also VOC-free. When used for coloring they must not alter the performance properties of the emulsion paints, so giving a tack-free surface which, moreover, has a low level of water absorption in comparison to the uncolored system.

Surprisingly it has been found that certain polyalkylene glycols, defined below, in conjunction with polyglycol alkyl ethers achieve the object stated above, where appropriate with fats and/or oils or further adjuvants.

The present invention provides aqueous pigment preparations comprising
(A) at least one organic and/or inorganic pigment,
(B) dispersants and/or surfactants,
(C) a trihydric or higher polyhydric alkoxylated alcohol which is preferably branched, in particular star-branched,
(D) a polyglycol alkyl ether,
(E) if desired, hydrotropic oligomers and/or polymers,
(F) if desired, fats, oils or fatty acids,
(G) if desired, further additives conventional for producing aqueous pigment dispersions, and
(H) water.

Preferred pigment preparations contain 5% to 80% by weight, 10% to 70% by weight for example of component (A).
Preferred pigment preparations contain 0.1% to 30% by weight, 2% to 15% by weight for example of component (B).
Preferred pigment preparations contain 0.1% to 30% by weight, 3% to 15% by weight for example of component (C).
Preferred pigment preparations contain 0.1% to 20% by weight, 1% to 10% by weight for example of component (D).
Particularly preferred pigment preparations contain the following weight percentages of each component:
(A) 5% to 80%, 10% to 70% for example,
(B) 0.1% to 30%, 2% to 15% for example,
(C) 0.1% to 30%, 3% to 15% for example,
(D) 0.1% to 20%, 1% to 10% for example,
(E) 0% to 20%, 0.1% to 10% for example,
(F) 0% to 10%, 0.1% to 7% for example,
(G) 0% to 30%, 0.1% to 5% for example, and
(H) as the remainder, water,
based in each case on the total weight of the pigment preparation.

Where one or more of components (E), (F) and (G) are present their minimum concentration independently of one another is advantageously at least 0.01%, preferably at least 0.1%, by weight based on the total weight of the pigment preparation.

Component (A) of the pigment preparation of the invention is a finely divided organic or inorganic pigment or a mixture of different organic and/or inorganic pigments. Component (A) may also be a dye which is insoluble in certain solvents, in which it has pigment character. The pigments can be employed both in the form of dry powders and as water-moist presscakes.

Suitable organic pigments include monoazo, disazo, laked azo, β-naphthol, naphthol AS, benzimidazolone, disazo condensation, and azo metal complex pigments, and polycyclic pigments such as phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline, and diketopyrrolopyrrole pigments, for example, or carbon blacks.

Among the stated organic pigments particular suitability is possessed by those which are very finely divided for the production of the preparations, with preferably 95% and more preferably 99% of the pigment particles possessing a size ≦500 nm.

Depending on the pigment used, the morphology of the pigment particles may differ very sharply, and, accordingly, the viscosity behavior of the pigment preparations may be very different in dependence on the particle shape. In order to obtain ideal, Newtonian viscosity behavior in the preparations, the particles ought preferably to possess a form ranging from spherical to cubic (with flattened-off corners).

As an exemplary selection of particularly preferred organic pigments mention may be made of carbon black pigments, such as gas blacks or furnace blacks; monoazo and disazo pigments, particularly the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Yellow 219, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and naphthol AS pigments, particularly the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, particularly the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, particularly the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, particularly the Colour Index pigments Pigment Yellow 139 or Pigment Yellow 173; phthalocyanine pigments, particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone, and thioindigo pigments, particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, particularly the Colour Index pigments Pigment Red 169, Pigment Blue 56 or Pigment Blue 61; diketopyrrolopyrrole pigments, particularly the Colour Index pigments Pigment Red 254, Pigment Red 255, Pigment Red 264, Pigment Red 270, Pigment Red 272, Pigment Orange 71, Pigment Orange 73, and Pigment Orange 81.

The organic pigment is preferably combined with carbon black and/or titanium dioxide. Additionally suitable are laked dyes such as Ca, Mg, and Al lakes of dyes containing sulfonic and/or carboxylic acid groups.

Examples of suitable inorganic pigments include titanium dioxides, zinc sulfides, zinc oxides, iron oxides, magnetite, manganese iron oxides, chromium oxides, ultramarine, nickel or chromium antimony titanium oxides, manganese titanium rutiles, cobalt oxides, mixed oxides of cobalt and aluminum, rutile mixed-phase pigments, sulfides of rare earths, spinels of cobalt with nickel and zinc, spinels based on iron and chromium with copper, zinc and manganese, bismuth vanadates, and extender pigments.

Use is made in particular of the Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6. Preference is also frequently given to using mixtures of inorganic pigments. Mixtures with organic pigments are likewise frequently used.

In place of pigment dispersions it is also possible to prepare dispersions which comprise as solids, for example, natural finely divided ores, minerals, sparingly soluble or insoluble salts, particulate waxes or plastics, dyes, crop protection agents and pesticide agents, UV absorbers, optical brighteners, and polymerization stabilizers.

Serving as component (B) of the pigment preparations of the invention are conventional dispersants and surfactants that are suitable for producing aqueous pigment dispersions, or mixtures of such substances. It is usual to use anionic, cationic, amphoteric or nonionic surface-active compounds for this purpose. Particularly well established among these are dispersants which possess one or more medium-length or long hydrocarbon chains, in part including those which possess aromatic ring groups. Of the multiplicity of compounds, only a selection will be cited at this point, but without restricting the applicability of compounds of the invention to these examples. Examples are alkyl sulfates such as lauryl sulfate, stearyl sulfate or octadecyl sulfate, primary alkylsulfonates such as dodecylsulfonate, and secondary alkylsulfonates, particularly the sodium salt of $C_{13}$-$C_{17}$ alkane-sulfonate, alkyl phosphates, alkylbenzenesulfonates such as dodecylbenzenesulfonic acid, and all salts of these compounds. Soya lecithin is additionally suitable, or condensation products of fatty acid and taurine or hydroxyethanesulfonic acid are used, as are alkoxylation products of alkylphenols, castor oil rosin esters, fatty alcohols, fatty amines, fatty acids and fatty acid amides; these alkoxylation products may likewise have been equipped with ionic end groups: for example, as sulfosuccinic monoesters or else as sulfonic, sulfuric, and phosphoric esters, and also salts thereof, the sulfonates, sulfates or phosphates. Also suitable are oxalkylated addition compounds which are obtained by reacting polyepoxides with amines or bisphenol-A or else bisphenol-A derivatives with amines, and so, too, are urea derivatives in a similar way.

Likewise suitable are reaction products of substituted and unsubstituted long-chain and shorter-chain alkylphenols and also their polymeric derivatives, e.g., formaldehyde condensation products, the novolaks. Mention may also be made of nonionic alkoxylated styrene-phenol condensates, which are obtained by addition reaction of unsubstituted or substituted styrenes with unsubstituted or substituted phenols and reaction with ethylene oxide and/or propylene oxide, and also the ionically modified derivatives of these, in the form of sulfonic, sulfuric, and phosphoric esters, for example, and also their salts, the sulfonates, sulfates or phosphates. Suitable surface-active compounds of component (B) include, moreover, lignin-sulfonates and polycondensates of β-naphthalenesulfonic acid and formaldehyde, and also of alkylarylsulfonic acids, haloarylsulfonic acid, sulfonated phenols or sulfonated β-naphthols with formaldehyde. Also suitable, finally, are polymeric dispersants, examples being aqueous acrylate resin solutions with a strength of preferably 5 to 40 percent by weight and formed from dissolved polyacrylates which have been brought into solution with the aid of bases, by neutralization of the vinylic acid units. The polyacrylates used for this purpose are frequently copolymers composed essentially of 30 to 80 mol % of monoalkylene aromatics and 20 to 70 mol % of acrylic and/or methacrylic acids and/or esters of acrylic and/or methacrylic acid. The polyacrylates used usually have number-average molar masses $M_n$ of between 1000 and 100 000 g/mol, preferably 2000 to 50 000 g/mol.

Compounds suitable as component (C) are polyalkylene glycols of at least trihydric—for example, trihydric, tetrahydric, pentahydric or hexahydric—alcohols, which are preferably branched and with particular preference are star-branched. By star-branched compounds are meant those having at least one quaternary aliphatic carbon atom. Examples of suitable alcohols are glycerol, diglycerol, triglycerol, oligoglycerols, trimethylolethane, trimethylolpropane, 1,2,3-hexanetriol, sorbitol, mannitol, pentaerythritol, and dipentaerythritol. The stated alcohols are alkoxylated per mole with up to 1000 mol of alkylene oxide, preferably 4 to 200 mol of alkylene oxide, such as ethylene oxide, propylene oxide, n-butylene oxide, isobutylene oxide, styrene oxide, for example, or a mixture thereof.

Particularly preferred as component (C) are compounds of the formula (1)

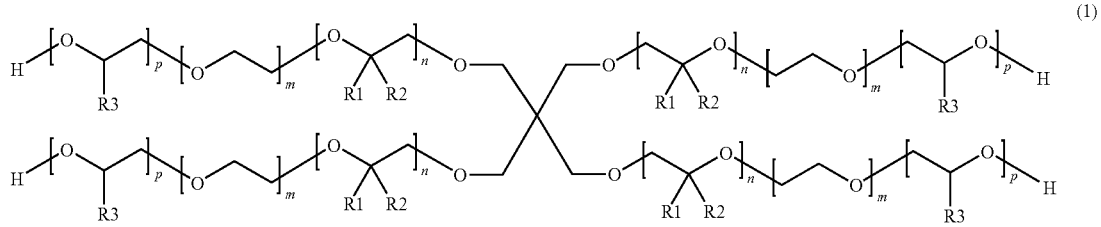

in which
- $R^1$, $R^2$, $R^3$ each independently is hydrogen, a branched or unbranched $C_1$-$C_{20}$-alkyl or $C_3$-$C_{20}$-cycloalkyl radical, a branched or unbranched $C_2$-$C_{20}$-alkenyl or $C_3$-$C_{20}$-cycloalkenyl radical, a benzyl radical or a phenyl radical, preferably H, $CH_3$ or $C_2H_5$, and
- m is on average a number from 0 to 100, preferably from 1 to 60, more preferably 4 to 25,
- n is on average a number from 0 to 100, preferably from 0 to 60, more preferably 0 to 10,
- p is on average a number from 0 to 100, preferably from 0 to 60, more preferably 0 to 10 the sum m+n+p being at least 1, preferably at least 4, and more preferably 15 to 30. The compound of the formula (1) is prepared by alkoxylating pentaerythritol with at least four times the molar amount of alkoxide. This, of course, produces mixtures having alkoxide chains of different length, so that only average values can be stated for the numbers m, n and p.

The polyglycol alkyl ether corresponding to component (D) is preferably a compound of the formula (2)

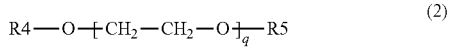

in which
- $R^4$ is a substituted or unsubstituted, unbranched or, preferably, branched $C_2$-$C_{20}$-alkyl or $C_3$-$C_{20}$-cycloalkyl radical or a substituted or unsubstituted, branched or unbranched $C_2$-$C_{20}$-alkenyl or $C_3$-$C_{20}$-cycloalkenyl radical, the substituents being 1, 2, 3 or 4 radicals from the group consisting of halogen, aryl, aryl($C_1$-$C_{20}$)alkyl, $C_5$-$C_6$-cycloalkyl, hetaryl, hetaryl($C_1$-$C_{20}$)alkyl or $C_1$-$C_{20}$-alkoxy,
- q is a number from 1 to 200, preferably 50 to 120,
- $R^5$ is H, XM or a substituted or unsubstituted, unbranched or, preferably, branched $C_2$-$C_{20}$-alkyl or $C_3$-$C_{20}$-cycloalkyl radical or a substituted or unsubstituted, branched or unbranched $C_2$-$C_{20}$-alkenyl or $C_3$-$C_{20}$-cycloalkenyl radical, the substituents being 1, 2, 3 or 4 radicals from the group consisting of halogen, aryl, aryl($C_1$-$C_{20}$)alkyl, $C_5$-$C_6$-cycloalkyl, hetaryl, hetaryl($C_1$-$C_{20}$)alkyl or $C_1$-$C_{20}$-alkoxy, where
- X is $SO_3^-$, $SO_2^-$, $CH_2COO^-$, $PO_3^{-2}$ or $PO_3M^-$, and
- M is H, a monovalent metal cation, a divalent metal cation, $NH_4^+$, a secondary, tertiary or quaternary ammonium ion, or a combination thereof.

As component (E), hydrotropic retention agents are used. Suitable retention agents include compounds which where appropriate also serve as solvents or are of oligomeric or polymeric nature, examples being formamide, urea, tetramethylurea, ε-caprolactam, ethylene glycol, propylene glycol, diethylene glycol, triethylene glycol, polyethylene glycol, α-methyl-ω-hydroxy-polyethylene glycol ethers, dimethylpolyethylene glycol ethers, dipropylene glycol, polypropylene glycol, dimethylol propylene glycol ethers, copolymers of ethylene glycol and propylene glycol, butyl glycol, methylcellulose, glycerol, diglycerol, polyglycerol, N-methylpyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, sodium butyl monoglycol sulfate, cellulose derivatives, gelatin derivatives, polyvinylpyrrolidone, polyvinyl alcohol, polyvinylimidazole, and copolymers and terpolymers of vinylpyrrolidone, vinyl acetate, and vinylimidazole, it being possible for the polymers containing vinyl acetate units to be subjected subsequently to hydrolysis to form the vinyl alcohol.

Component (F) comprises fats and oils of vegetable and animal origin, examples being bovine tallow, palm kernel fat, coconut fat, rapeseed oil, sunflower oil, linseed oil, palm oil, soya oil, peanut oil, and whale oil, cottonseed oil, corn oil, poppy oil, olive oil, castor oil, colza oil, safflower oil, soybean oil, sunflower oil, herring oil, and sardine oil. Further customary additives include the saturated and unsaturated higher fatty acids, e.g., palmitic acid, cyprylic acid, capric acid, myristic acid, lauric acid, stearic acid, oleic acid, linoleic acid, linolenic acid, caproic acid, caprylic acid, arachidic acid, behenic acid, palmitoleic acid, gadoleic acid, erucic acid, and ricinoleic acid, and also their salts.

As component (G) use is made, for example, of cationic, anionic, amphoteric or nonionic compounds which promote pigment wetting (wetting agents). Also employed are thickeners, preservatives, viscosity stabilizers, grinding assistants, and fillers. Further customary additives possible are antisettling agents, light stabilizers, anti-oxidants, devolatilizers/defoamers, foam reducers, anticaking agents, and additives which favorably influence the viscosity and rheology.

Suitable agents for regulating the viscosity include, for example, polyvinyl alcohol and cellulose derivatives. Water-soluble natural or synthetic resins and also polymers as film formers or binders for increasing adhesion and abrasion resistance are likewise suitable. pH regulators employed include organic or inorganic bases and acids. Preferred organic bases are amines, such as ethanolamine, diethanolamine, triethanolamine, N,N-dimethylethanolamine, diisopropylamine, aminomethylpropanol or dimethylaminomethylpropanol, for example. Preferred inorganic bases are sodium hydroxide, potassium hydroxide, lithium hydroxide or ammonia.

Water used for producing the pigment preparations, component (H), is employed preferably in the form of demineralized or distilled water. Drinking water (mains water) and/or water of natural origin may also be used.

The present invention additionally provides a process for producing the pigment preparations of the invention, which comprises dispersing component (A) in the form of powder, granules or aqueous presscake in the presence of water (H) and of components (B), (C) and (D), then mixing in, where appropriate, water (H), and also, where appropriate, one or more of components (E), (F) and (G), and adjusting the resultant aqueous pigment dispersion to the desired concentration with water (H). Preferably components (B), (C) and (D) and, where appropriate, one or more of components (E), (F) and (G) are first of all mixed and homogenized, and then component (A) is stirred into the initial mixture, with the pigment being pasted up and predispersed. Depending on the harshness of grain of the pigments employed, this may be followed by fine division or fine dispersion, with the aid of a milling or dispersing apparatus, if appropriate with cooling. Agitator mechanisms, dissolvers (sawtooth stirrers), rotor-stator mills, ball mills, agitator ball mills such as sand mills and bead mills, high-speed mixers, kneading apparatus, roll mills or high-performance bead mills may be used for this purpose. The pigments are finely dispersed or milled until the desired particle size distribution is reached, in operations which can take place at temperatures in the range from 0 to 100° C., advantageously at a temperature between 10 and 70° C., preferably at 20 to 60° C. Following the fine dispersing the pigment preparation can be diluted further with water (H), preferably deionized or distilled water.

The pigment preparations of the invention are suitable for pigmenting and coloring natural and synthetic materials of all kinds, particularly aqueous coating materials, emulsion paints, and colored coatings (dispersion-based coating materials).

The pigment preparations of the invention are further suitable for coloring macro-molecular materials of all kinds, examples being natural and synthetic fiber materials, preferably cellulose fibers, and also for the mass coloring of paper, and for coloring laminate. Further applications are the production of printing inks, examples including inks for textile, flexographic, decorative or gravure printing, wallpaper colors, water-thinnable paints, wood preservation systems, the spin coloring of viscose, varnishes, sausage skins, seed, fertilizers, glass, especially glass bottles, and also for the mass coloring of roof shingles, for coloring for renders, concrete, wood stains, colored pencil leads, fibertip pens, waxes, paraffins, graphics inks, ballpoint pen pastes, chalks, laundry detergents and cleaning products, shoe polishes, latex products, abrasives, and also for coloring plastics or high molecular mass materials of all kinds. Examples of high molecular mass organic materials include cellulose ethers and cellulose esters, such as ethylcellulose, nitrocellulose, cellulose acetate or cellulose butyrate, natural resins or synthetic resins, such as polymerization resins or condensation resins, e.g., amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, and polyacrylic esters, polyamides, polyurethanes or polyesters, rubber, casein, lattices, silicone, and silicone resins, individually or in a mixture.

The pigment preparations of the invention are further suitable for producing printing inks for use in all conventional ink-jet printers, particularly for those based on the bubble jet or piezo process. These printing inks can be used to print paper and also natural or synthetic fiber materials, foils, and plastics. Additionally the pigment preparations of the invention can be used for printing any of a very wide variety of kinds of coated or uncoated substrate materials: for example, for printing paperboard, cardboard, wood and wood base materials, metallic materials, semiconductor materials, ceramic materials, glasses, glass and ceramic fibers, inorganic materials of construction, concrete, leather, comestibles, cosmetics, skin, and hair. This substrate material may be two-dimensionally planar or may be extended spatially, i.e., may be of three-dimensional form, and may be printed or coated completely or only in parts.

The pigment preparations of the invention are additionally suitable as colorants in electrophotographic toners and developers, such as one- or two-component powder toners (also called one- or two-component developers), magnetic toners, liquid toners, latex toners, polymerization toners and specialty toners. Typical toner binders in this context are addition-polymerization resins, polyaddition resins, and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may contain further ingredients, such as charge control agents, waxes or flow assistants, or may be subsequently modified with these adjuvants.

The pigment preparations of the invention are further suitable for use as colorants for powders and powder coating materials, especially for triboelectrically or electrokinetically sprayable powder coating materials, which are used to coat the surfaces of articles made, for example, of metal, wood, plastic, glass, ceramic, concrete, textile material, paper or rubber.

Furthermore, the pigment preparations of the invention are suitable for use as colorants in inks, preferably ink-jet inks, such as, for example, those on an aqueous or nonaqueous basis ("solvent based"), microemulsion inks, UV-curable inks, and in inks which operate by the hot-melt process. Ink-jet inks generally contain in total 0.5% to 15%, preferably 1.5% to 8%, by weight (calculated on a dry basis) of the pigment preparation of the invention. Microemulsion inks are based on organic solvents, water, and, if desired, an additional hydrotropic substance (interface mediator). Microemulsion inks contain 0.5% to 15%, preferably 1.5% to 8%, by weight of the pigment preparation of the invention, 5% to 99% by weight of water, and 0.5% to 94.5% by weight of organic solvent and/or hydrotropic compound. "Solvent based" ink-jet inks contain preferably 0.5% to 15% by weight of the pigment preparation of the invention, 85% to 99.5% by weight of organic solvent and/or hydrotropic compounds. UV-curable inks contain essentially 0.5% to 30% by weight of the pigment preparation of the invention, 0.5% to 95% by weight of water, 0.5% to 95% by weight of organic solvent or solvent mixture, 0.5% to 50% by weight of a radiation-curable binder, and, where appropriate, 0 to 10% by weight of a photoinitiator. Hot-melt inks are usually based on waxes, fatty acids, fatty alcohols or sulfonamides which are solid at room temperature and liquefy on heating, the preferred melting range being between about 60° C. and about 140° C. Hot-melt ink-jet inks are composed, for example, essentially of 20% to 90% by weight of wax and 1% to 10% by weight of the pigment preparation of the invention. They may further include 0 to 20% by weight of an additional polymer (as "dye dissolver"), 0 to 5% by weight of dispersing assistant, 0 to 20% by weight of viscosity modifier, 0 to 20% by weight of plasticizer, 0 to 10% by weight of tack additive, 0 to 10% by weight of transparency stabilizer (which prevents, for example, crystallization of the waxes), and 0 to 2% by weight of antioxidant.

In addition the pigment preparations of the invention are also suitable as colorants for color filters for flat panel displays, and also for both additive and subtractive color generation, and additionally for photoresists, and also as colorants for electronic inks ("e-inks") or electronic paper ("e-paper").

EXAMPLES

Assessment of a Pigment Preparation

The color strength and shade were determined in accordance with DIN 55986. For the rub-out test the emulsion paint or the varnish, after mixing with the pigment dispersion, was applied to a paint chart. Subsequently the applied coating was rubbed with the finger on the lower part of the paint chart. Incompatibility was present if the rubbed area is then more strongly or brightly colored than the adjacent untreated area (the rub-out test is described in DE 2 638 946). The coloristic data and the compatibilities with the media for coloring were determined using up to eight different commercial white dispersions and up to two different commercial varnishes. The resistance to dryout was assessed by introducing the pigment preparation into an indentation in a spot plate. The dispersion was assessed after 1, 4, 8, 24 and 48 hours. The parameters assessed were skinning and the general dryout. The viscosity was determined using a cone-and-plate viscometer (Roto Visco 1) from Haake at 20° C. (titanium cone: Ø 60 mm, 1°), the relationship between viscosity and shear rate within a range between 0 and 200 s$^{-1}$ being investigated. The viscosities were measured at a shear rate of 60 s$^{-1}$.

For assessing the storage stability of the dispersions, the viscosity was measured directly after production of the preparation and also after four-week storage at 50° C. and after storage in a climatically controlled chamber at <0° C.

Production of a Pigment Preparation:

The pigment, in the form alternatively of powder, granules or presscake, was pasted in deionized water, together with the dispersants and the other adjuvants, and then homogenized and predispersed using a dissolver (e.g., from VMA-Getzmann GmbH, type AE3-M1) or other suitable apparatus. Subsequent fine dispersion took place by means of a bead mill (e.g., AE3-M1 from VMA-Getzmann) or else another suitable dispersing apparatus, with milling taking place with siliquarzite beads or zirconium mixed oxide beads of size d=1 mm, accompanied by cooling, until the desired color strength and coloristic properties were obtained. Thereafter the dispersion was adjusted with deionized water to the desired end pigment concentration, the grinding media were separated off, and the pigment preparation was isolated.

The pigment preparations described in the examples below were produced in accordance with the method described above, the following constituents being used in the amounts stated so as to give 100 parts of each pigment preparation. In the examples below, parts are by weight.

Example 1

| | |
|---|---|
| 48 parts | component (A), C.I. Pigment Yellow 74 |
| 4 parts | component (B), ionically modified tristyrylphenyl oxyethylate |
| 5 parts | component (C), compound of the formula (1) with n = 0, m = 16, p = 4, R$^3$ = CH$_3$, |
| 5 parts | component (D), R$^4$ = isotridecyl, q = 100, R$^5$ = H |
| 1 part | component (F), vegetable oil |
| 4 parts | component (G), rheological additives |
| 0.9 part | component (G), preservative |
| Remainder | component (H), water |

The pigment preparation has a high color strength and is particularly stable to flocculation. In six different commercial white dispersions it can be incorporated very well, with ready dispersibility. The rub-out test in all cases shows no differences in color strength in comparison between the rubbed area and the untreated area. Accordingly the preparation is very compatible with the dispersions tested. The pigment preparation possesses excellent rheological properties and is found to be readily fluid and stable on storage. The viscosity after production is 0.58 Pa·s. Further, the preparation possesses good dryout resistance, beginning to dry out only after 24 hours.

Example 2

| | |
|---|---|
| 70 parts | component (A), C.I. Pigment Red 101 |
| 3 parts | component (B), ionically modified tristyrylphenyl oxyethylate |
| 5 parts | component (C), compound of the formula (1) with R$^3$ = CH$_3$, n = 0, m = 16, p = 4, |
| 5 parts | component (D), R$^4$ = isotridecyl, q = 100, R$^5$ = H |
| 2 parts | component (G), rheological additives |
| 0.9 part | component (G), preservative |
| Remainder | component (H), water |

The pigment preparation has coloristic properties corresponding to those of the standard dispersion and is particularly stable to flocculation. In six different white dispersions it can be incorporated very well, with ready dispersibility. The rub-out test in all cases shows no differences in color strength in comparison between the rubbed area and the untreated area. Accordingly the preparation is very compatible with the dispersions tested. For inorganic pigment pastes the pigment preparation possesses excellent rheological properties and is found to be readily fluid and stable on storage. The viscosity after production is 2.3 Pa·s. Further, the preparation possesses good dryout resistance, beginning to dry out only after 24 hours.

Comparative Example 2a

| | |
|---|---|
| 70 parts | component (A), C.I. Pigment Red 101 |
| 3 parts | component (B), ionically modified tristyrylphenyl oxyethylate |
| 10 parts | component (E), triethylene glycol |
| 2 parts | component (G), rheological additives |
| 0.9 part | component (G), preservative |
| Remainder | component (H), water |

Example 3

| | |
|---|---|
| 70 parts | component (A), C.I. Pigment Brown 24 |
| 3 parts | component (B), ionically modified tristyrylphenyl oxyethylate |
| 3 parts | component (B), fatty acid oxyethylate, ionically modified |

| | |
|---|---|
| 5 parts | component (C), compound of the formula (1) with $R^1$ = H, $R^2$ = $CH_3$, n = 20, m = 5, p = 0, |
| 10 parts | component (D), $R^4$ = isotridecyl, q = 100, $R^5$ = H |
| 1 parts | component (G), rheological additive |
| 0.9 part | component (G), preservative |
| Remainder | component (H), water |

The pigment preparation has coloristic properties corresponding to those of the standard dispersion and is particularly stable to flocculation. In six different white dispersions it can be incorporated very well, with ready dispersibility. The rub-out test in all cases shows no differences in color strength in comparison between the rubbed area and the untreated area. Accordingly the preparation is very compatible with the dispersions tested. For inorganic pigment pastes the pigment preparation possesses excellent rheological properties and is found to be readily fluid and stable on storage. The viscosity after production is 1.9 Pa·s. Further, the preparation possesses good dryout resistance, beginning to dry out only after 24 hours.

Example 4

| | |
|---|---|
| 62 parts | component (A), C.I. Pigment Blue 28 |
| 4 parts | component (B), tristyrylphenyl oxyethylate |
| 5 parts | component (C), compound of the formula (1) with $R^3$ = $CH_3$, n = 0, m = 16, p = 4, |
| 5 parts | component (D), $R^4$ = isotridecyl, q = 100, $R^5$ = H |
| 2.5 parts | component (E), polyvinylpyrrolidone |
| 1 part | component (G), rheological additive |
| 0.9 part | component (G), preservative |
| Remainder | component (H), water |

The pigment preparation has coloristic properties corresponding to those of the standard. In six different white dispersions it can be incorporated very well, with ready dispersibility. The rub-out test in all cases shows no differences in color strength in comparison between the rubbed area and the untreated area, so that no flocculation phenomenon can be shown. Accordingly the preparation is of universal compatibility with the dispersions tested. The pigment preparation possesses excellent rheological properties and is found to be readily fluid and stable on storage. The viscosity after production is 2.0 Pa·s. Further, the preparation possesses good dryout resistance, beginning to dry out only after 24 hours.

Example 5

| | |
|---|---|
| 70 parts | component (A), C.I. Pigment Brown 24 |
| 3 parts | component (B), ionically modified tristyrylphenyl oxyethylate |
| 3 parts | component (B), fatty acid oxyethylate, ionically modified |
| 5 parts | component (C), compound of the formula (1) with $R^1$ = H, $R^2$ = $CH_3$, n = 20, m = 5, p = 0, |
| 5 parts | component (D), $R^4$ = isotridecyl, q = 100, $R^5$ = H |
| 2.5 parts | component (E), polyvinylpyrrolidone |
| 1 part | component (G), rheological additive |
| 0.9 part | component (G), preservative |
| Remainder | component (H), water |

The pigment preparation has coloristic properties corresponding to those of the standard dispersion and is particularly stable to flocculation. In six different white dispersions it can be incorporated very well, with ready dispersibility. The rub-out test in all cases shows no differences in color strength in comparison between the rubbed area and the untreated area. Accordingly the preparation is very compatible with the dispersions tested. For inorganic pigment pastes the pigment preparation possesses excellent rheological properties and is found to be readily fluid and stable on storage. The viscosity after production is 1.9 Pa·s. Further, the preparation possesses good dryout resistance, beginning to dry out only after 24 hours.

The invention claimed is:
1. An aqueous pigment preparation comprising
   (A) at least one organic pigment inorganic pigment or a mixture thereof,
   (B) at least one dispersant, surfactant or both,
   (C) an alkoxylated alcohol of the formula (1)

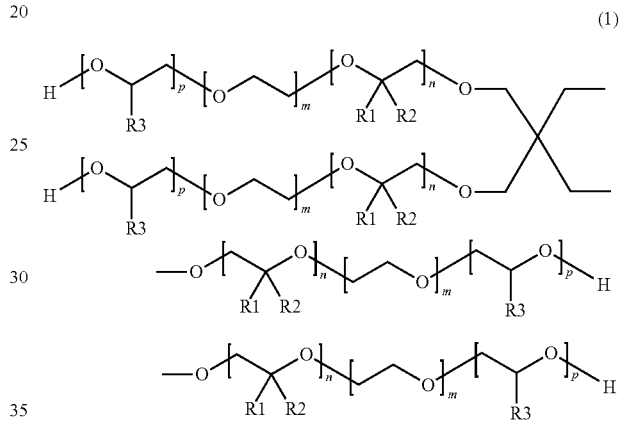

wherein $R^1$, $R^2$, $R^3$ are each independently hydrogen, $C_1$-$C_{20}$-alkyl, $C_3$-$C_{20}$-cycloalkyl,
   $C_2$-$C_{20}$-alkenyl, $C_3$-$C_{20}$-cycloalkenyl, phenyl or benzyl,
m is on average a number from 0 to 100
n is on average a number from 0 to 100
p is on average a number from 0 to 100,
the sum m+n+p being at least 1
(D) a polyglycol alkyl ether, wherein the polyglycol alkyl ether is a compound of the formula (2)

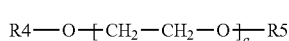

wherein
$R^4$ is a substituted or unsubstituted, unbranched or branched $C_{13}$-$C_{20}$-alkyl the substituents being 1, 2, 3 or 4 radicals selected from the group consisting of halogen, aryl, aryl($C_1$-$C_{20}$)alkyl, $C_5$-$C_6$-cycloalkyl, hetaryl, hetaryl($C_1$-$C_{20}$)alkyl and $C_1$-$C_{20}$-alkoxy,
q is a number from 1 to 200,
$R^5$ is H, XM or a substituted or unsubstituted, unbranched or branched $C_2$-$C_{20}$-alkyl or $C_3$-$C_{20}$-cycloalkyl radical or a substituted or unsubstituted, branched or unbranched $C_2$-$C_{20}$-alkenyl or $C_3$-$C_{20}$-cycloalkenyl radical, the substituents being 1, 2, 3 or 4 radicals selected from the group consisting of halogen, aryl, aryl ($C_1$-$C_{20}$)alkyl, $C_5$-$C_6$-cycloalkyl, hetaryl, hetaryl($C_1$-$C_{20}$)alkyl and $C_1$-$C_{20}$-alkoxy, where
X is $SO_3^-$, $SO_2^-$, $CH_2COO^-$, $PO_3^{2-}$ or $PO_3M^-$ and M is H, a monovalent metal cation, a divalent metal cation, $NH_4^+$, a secondary, tertiary or quaternary ammonium ion, or a combination thereof.

(E) optionally, hydrotropic oligomers, polymers or a mixture thereof, (F) optionally, fats, oils or fatty acids, (G) optionally, additives for producing aqueous pigment dispersions, and (H) water.

2. The pigment preparation as claimed in claim 1, wherein the organic pigment of component (A) is a monoazo, disazo, laked azo, β-naphthol, naphthol AS, benzimidazolone, disazo condensation, azo metal complex pigment or a polycyclic pigment selected from the group consisting of phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline, and diketopyrrolopyrrole pigments or carbon blacks.

3. The pigment preparation as claimed in claim 1, comprising 5% to 80% by weight of component (A).

4. The pigment preparation as claimed in claim 1, comprising 0.1% to 30% by weight of component (C).

5. The pigment preparation as claimed in claim 1, comprising the following weight percentages of each component:

(A) 5% to 80% by weight,
(B) 0.1% to 30% by weight,
(C) 0.1% to 30% by weight,
(D) 0.1% to 20% by weight,
(E) 0% to 20% by weight,
(F) 0% to 10% by weight,
(G) 0% to 30% by weight,
(H) water, based in each case on the total weight of the pigment preparation.

6. A process for producing a pigment preparation as claimed in claim 1, comprising the steps of dispersing component (A), wherein component (A) is in the form of powder, granules or aqueous presscake in the presence of water (H) and components (B), (C), and (D), and optionally water (H), and, optionally, one or more of components (E), (F), and (G), and, optionally, adding water (H) to the resultant aqueous pigment dispersion.

7. A pigmented natural or synthetic material pigmented by the aqueous pigment preparation as claimed in claim 1.

8. A composition pigmented by the aqueous pigment preparation as claimed in claim 1, wherein the composition is selected from the group of aqueous coating materials, emulsion paints, colored coatings, water-thinnable paints, wallpaper inks and printing inks.

9. An article pigmented by the aqueous pigment preparation as claimed in claim 1, wherein the article is in the form of natural fiber materials, synthetic fiber materials, cellulose fibers, paper, colored laminate, printing inks, ink-jet inks, electrophotographic toners, powder coating materials, color filters, electronic inks, electronic paper, color filters, wood preservation systems, colored viscose, sausage skins, seed, fertilizers, glass bottles, roof shingles, colored renders, concrete, wood stains, colored pencil leads, fibertip pens, waxes, paraffins, graphics inks, ballpoint pen pastes, chalks, detergents, cleaning products, shoe polishes, latex products, abrasives, or coloring plastics.

10. The pigment preparation as claimed in claim 1, wherein q is from 50 to 120.

11. The pigment preparation as claimed in claim 1, wherein $R^5$ is a branched $C_2$-$C_{20}$-alkyl or $C_3$-$C_{20}$-cycloalkyl radical.

12. The pigment preparation as claimed in claim 1, wherein q is 50 to 200.

\* \* \* \* \*